Oct. 21, 1958  O. HACKER  2,856,706
TRACKLAYING TRACTOR WITH EXCHANGEABLE WORKING IMPLEMENTS
Filed Oct. 6, 1953  2 Sheets-Sheet 1
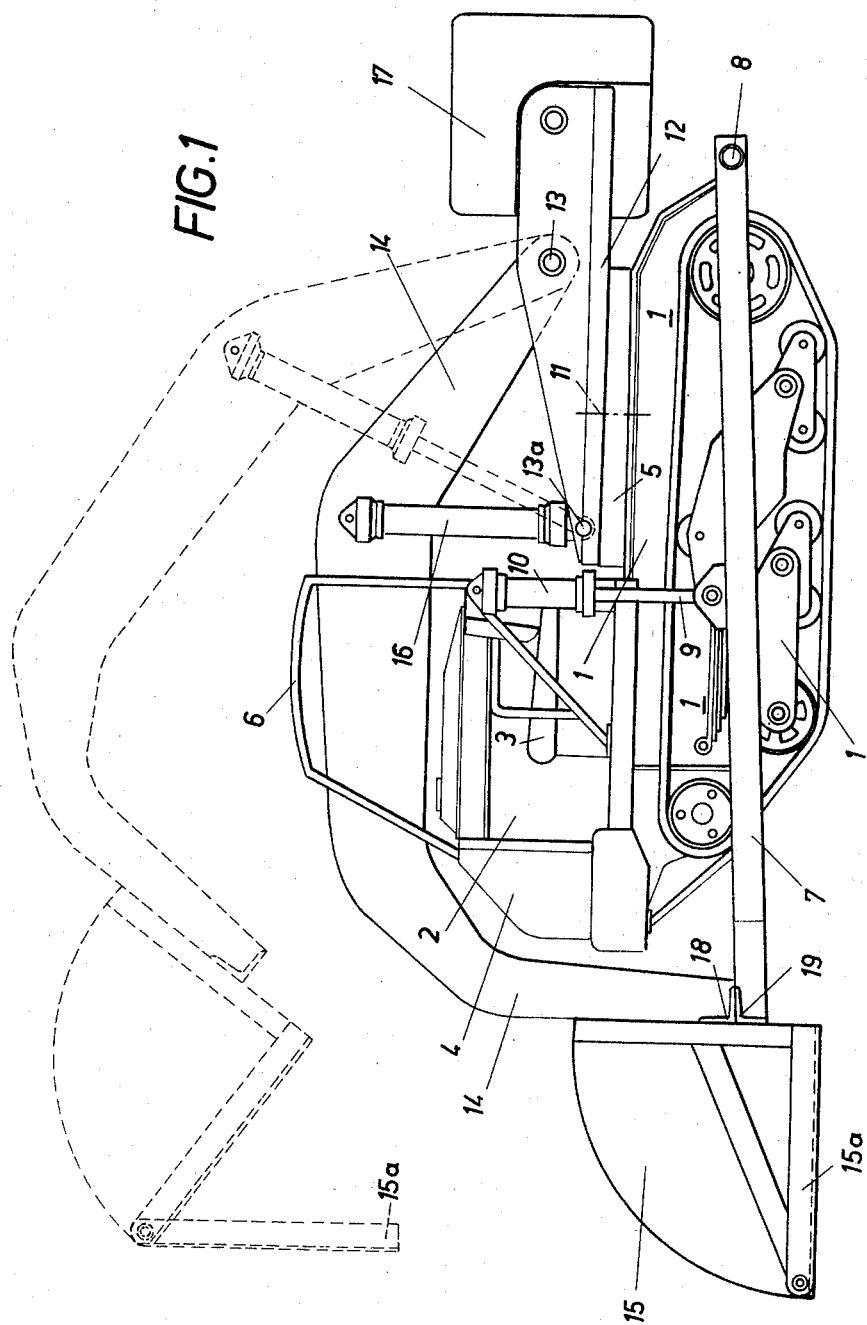

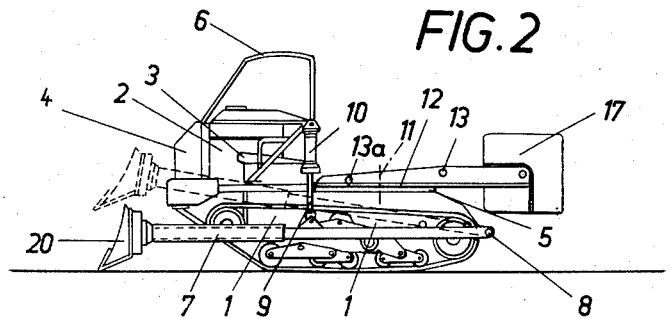
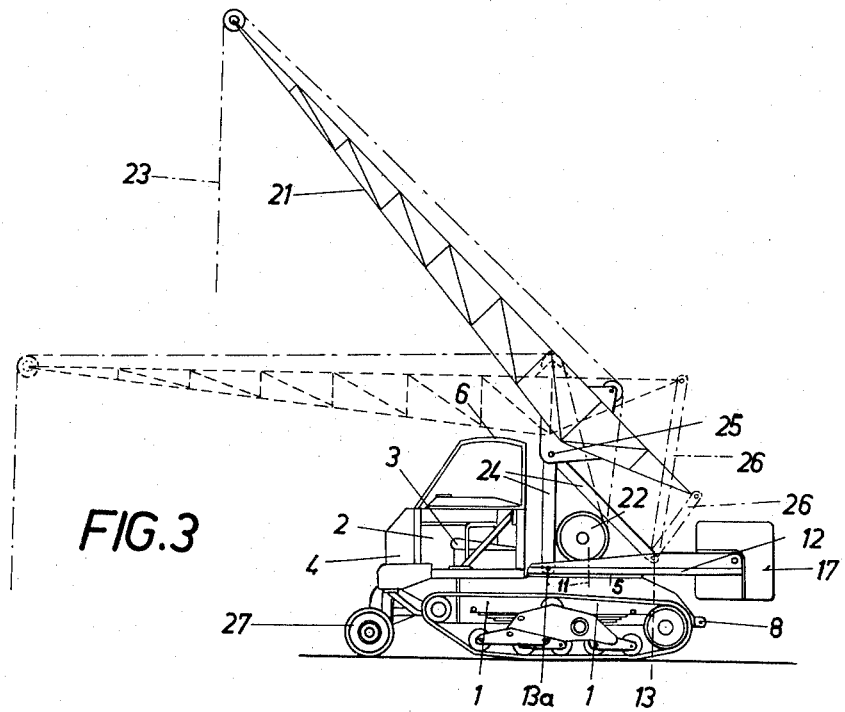

United States Patent Office 2,856,706
Patented Oct. 21, 1958

2,856,706

TRACKLAYING TRACTOR WITH EXCHANGEABLE WORKING IMPLEMENTS

Oskar Hacker, Vienna, Austria

Application October 6, 1953, Serial No. 384,445

Claims priority, application Austria October 7, 1952

2 Claims. (Cl. 37—117.5)

This invention relates to a tracklaying tractor with exchangeable working implements, particularly for earthworking and loading operations.

Tracklaying tractors are known, which for earth moving operations are equipped with grading shovels. In grading shovel units arranged on tracklaying tractors the shovel is arranged to be lifted hydraulically, so that the material on the shovel can be moved in a lifted condition and loaded or dumped at any desired place. Moreover, it is known to mount rope winches or crane jibs on tracklaying tractors for performing various lifting, loading or earthworking operations. All these previously known constructions suffer the disadvantage that they cannot be exchanged for each other quickly on one and the same tractor.

It is an object of the invention to provide a tracklaying tractor which carries a detachable rotary jib arm arranged to improve the ground adhesion of the tractor and to minimize any tendency of the tractor to tilt.

With this and other objects in mind, which will become apparent as the specification proceeds, the invention provides in a tracklaying tractor comprising a track frame having front and rear portions and a pair of endless tracks supporting the track frame on the ground, the combination of an engine, main and auxiliary drives, driver's seat, accessories and controls, all of which are carried on said front portion, a rotary frame mounted on said rear portion for rotation on a vertical axis extending through the rear part of the area defined by the points of support of said tracks on the ground, said rotary frame being formed with two bearings arranged on opposite sides of said axis, a jib arm, and means supporting said jib arm on said rotary frame and readily detachably connected to both said bearings.

For earthworking operations the rotary frame has mounted thereon a jib arm which is carried for pivotal upward and downward movement and in arcuate shape bridges the front portion of the vehicle in the longitudinal direction thereof. Carrying a grading shovel, the front end of said jib arm is supported on the front end of a push frame, which is detachably fixed to the rear end of the vehicle and pivotally movable upwardly and downwardly. The jib arm for the shovel is pivotally movable upwardly and downwardly by means of a prop of adjustable length, which is supported in the rotary frame in the bearing most remote from a counterweight extending beyond the rear end of the tractor. At the middle of the length of the vehicle the push frame carried at the rear end of the vehicle is held by hydraulically adjustable carrying members in the desired angular position. The front end of the jib arm carrying the loading shovel rests in scraping position on a transverse member of the push frame, which during the scraping operation at the same time supports the shovel.

In the drawing three illustrative embodiments of the subject of the invention are illustrated, Fig. 1 showing the tracklaying tractor in conjunction with a loading implement which is usable as a grading implement at the same time, Fig. 2 showing the tracklaying tractor in use as a pure grader, and Fig. 3 showing the tracklaying tractor in use as a pure loader.

In the drawings, 1 designates the chassis or track frame of the tracklaying tractor, 2 the engine, 3 the driver's seat, 4 the end wall with built-in rope winch, 5 the mounting platform and 6 the frame structure for the protection of the driver. 7 designates a push frame, which at the rear end is detachably fixed to and pivotally movable upwardly and downwardly about the pivot 8, and which can be lifted and lowered by the operation of two carrying members of adjustable length, each of which is disposed on one side of the tractor and connected thereto at the middle of the length of the tractor, and pivotally connected to said push frame 7 at an intermediate point thereof. Each of said carrying members comprises a piston rod 9 and a hydraulic oil cylinder 10 operable to extend and retract said piston rod and thus to adjust the length of said carrying member.

On the rear half of the vehicle, which is provided with the mounting platform 5, a frame 12 is mounted, which is rotatable about the vertical pivot 11 disposed at the middle of the mounting platform 5. A bearing 13 of frame 12 has pivotally connected thereto an arcuate jib arm 14, whose front end carries a grading and loading shovel 15. The connection of the jib arm 14 to bearing 13 is effected by a horizontal pivot member detachably carried in bearing 13 and extending transversely of said rotary frame, said pivot member carrying the rear end of said jib arm with freedom of rotation on the axis of said member.

The arcuate jib arm 14 with shovel 15 is lifted, by a prop of adjustable length detachably fixed to the bearing 13a of rotary frame 12, from the lowermost or scraping position shown in the drawing into the loading position (shown with dash lines). Constituting a supporting member detachably connected to bearing 13a remote from the counterweight 17 and pivotally connected to the jib arm in front of the rear end thereof, said prop comprises a piston rod and a hydraulic oil cylinder 16 operable to extend and retract said piston rod and thus to vary the length of said prop. Hence the prop 16 and the pivot member carried in bearing 13 constitute means supporting said jib arm on said rotary frame and detachably connected to both said bearings.

For dumping, the bottom 15a of the shovel is unlocked and thus opened in the manner known. The counterweight 17 arranged on the end portion of the frame 12 protruding beyond the rear end of the tractor serves as a balance weight. The controls for lifting and turning mutually interlock in the manner known so that the shovel must be lifted first (position shown with dash lines) and only thereafter can be turned for dumping, e. g. on a truck arranged at the side. Lowering the shovel is possible only when the jib arm 14 for the shovel has been turned back first into the longitudinal direction of the vehicle. In its lowermost or scraping position the shovel 15 engages with its angle iron 18 the front transverse member 19 of the push frame 7. The freedom of rotation of the loading shovel about the pivot 11 enables the loading of the material carried on the shovel, such as sand, earth, coal or the like, on a truck placed at the side, after the tractor has simply been driven back. This avoids the previous necessity of performing with the tractor itself the rotary movement necessary for loading, which practice is known to lead to the formation of an impassable mire on wet or soft ground.

The cooperation of the push frame and its lifting gear, with the jib arm for the shovel and its lifting gear, serves the following purpose: To fill the shovel 15 the tracklaying tractor drives ahead against the material or body of earth to be taken up. The resulting horizontal compressive or shock stress is transmitted by the shovel 15 to the push frame 7, and by the latter through the pivot 8 to the chassis of the tractor 1. Thus the jib arm 14 itself is not subjected to the shock stress. In many cases the lifting of the filled shovel 15 involves the breaking of the earth not loosened, in front of the shovel, from the contents of the shovel. That breaking requires more power than the mere lifting of the filled shovel. According to the invention that extra lifting power is afforded by the simultaneous action of the hydraulic oil cylinder 10 and the hydraulic oil cylinder 16 at the moment of breaking. The cylinder 10 lifts the push frame 7, which by its transverse member 19 lifts the angle iron 18 of the shovel 15. At the same time the jib arm 14 is lifted by the cylinder 16. Thus the breaking of the shovel load from the surrounding earth or material to be loaded is effected by both cylinders. Once it has been broken from the ground the cylinder 16 and with it the lifting force of the arm 14 suffice for lifting the shovel load sufficiently for dumping it onto a vehicle placed at the side, after the loading gear has been turned about the pivot 11. When it is not necessary to take up material in a shovel and load or dump it at another place, the jib arm 14 for the shovel is removed, as shown in Fig. 2, and a conventional grading shovel 20 is mounted on the push frame 7. Then the hydraulic oil cylinder 10 effects in the manner known the lifting and lowering of the grading shovel 20 during the several phases of operation.

As is shown in Fig. 3, a loading jib arm 21 may be mounted with the aid of a supporting structure 24 on the mounting platform 5 and the rotary frame 12 rotatable on pivot 11. The front member of that structure 24 is a supporting member detachably connected to bearing 13a remote from counterweight 17 and pivotally connected to jib arm 21 in front of the rear end thereof. The rear member of the structure 24 is detachably connected to bearing 13. Thus the structure 24 constitutes means supporting said jib arm on said rotary frame and detachably connected to both said bearings. In the position shown in the drawing that loading arm may be used for loading work with the aid of a rope winch 22 and rope 23, or with the aid of a grab for the known operations. The upward and downward pivotal movement of the loading arm about the pivot 25 carried in the supporting structure 24 is effected by means of a pulling rope 26. The pivot 25 is seen to constitute a horizontal pivot member extending transversely of said rotary frame and carrying said jib arm with freedom of rotation on the axis of said pivot member. The push frame 7 is removed. The freedom of rotation of the frame 12 and the counterweight 17 provide for a wide range of rotation. For the travel from one job to another the loading arm is swung down into a horizontal position (shown with dash lines).

For increased stability a removable pair of wheels 27 may be attached to the front end of the tracklaying tractor.

The shovel 15 may be used for lighter loads without the counterweight 17, a shorter rotary frame 12 being provided so that the filled shovel can turn through a full circle of 360 deg. This enables the loading of a trailer which is arranged behind the tractor and during the loading operation is coupled with the tractor whereas it is hauled by another tractor for carrying off the material.

I claim:

1. In a tracklaying tractor comprising a track frame having front and rear portions and a pair of endless tracks supporting the track frame on the ground, the combination of drive means, driver's seat, accessories and controls, all of which are carried on said front portion, a rotary frame mounted on said rear portion for rotation on a vertical axis extending through the rear part of the area defined by the points of support of said tracks on the ground, said rotary frame being provided with two bearings arranged on opposite sides of said axis, a jib arm, a detachable horizontal pivot connecting the rear end of said jib arm to one of said bearings, first lifting means operable to lift said jib arm and comprising a thrust member of variable length detachably connected to the other of said bearings and pivotally connected to said jib arm in front of the rear end thereof, said jib arm being of a length to extend above and forwardly of the front end of the tractor when the jib arm is in its lowermost position, a shovel carried by the front end of said jib arm, a push frame affixed to the rear portion of the track frame within the height of said tracks and with freedom of vertical pivotal movement and adapted to engage and take up load from the front end of said jib arm in downward and rearward directions when said jib arm is in its lowermost position, and second lifting means operatively connected to said push frame and operable to lift the same and thus to assist said first lifting means in lifting said jib arm out of its lowermost position.

2. In a tracklaying tractor comprising a track frame having front and rear portions and a pair of endless tracks supporting the track frame on the ground, the combination of drive means, driver's seat, accessories and controls, all of which are carried on said front portion, a rotary frame mounted on said rear portion for rotation on a vertical axis extending through the rear part of the area defined by the points of support of said tracks on the ground, said rotary frame being provided with two bearings arranged on opposite sides of said axis, a jib arm, a detachable horizontal pivot connecting the rear end of said jib arm to one of said bearings, first lifting means operable to lift said jib arm and comprising a thrust member of variable length detachably connected to the other of said bearings and pivotally connected to said jib arm in front of the rear end thereof, said jib arm being of a length to extend above and forwardly of the front end of the tractor when the jib arm is in its lowermost position, a shovel carried by the front end of said jib arm, a push frame affixed to the rear portion of the track frame within the height of said tracks and with freedom of pivotal movement, a grading shovel detachably affixed to the front end of said push frame, said jib arm and said shovel carried thereby being in a raised position when said grading shovel is affixed to said push frame, said push frame being adapted when said grading shovel is removed to engage and take up load from the front end of said jib arm in downward and rearward directions when said jib arm is in its lowermost position, and second lifting means operatively connected to said push frame and operable to lift the same and thus to assist said first lifting means in lifting said jib arm out of its lowermost position.

References Cited in the file of this patent

UNITED STATES PATENTS

| | | |
|---|---|---|
| D. 163,884 | Mandt | July 10, 1951 |
| 1,597,620 | Parkey | Aug. 24, 1926 |
| 2,445,160 | Torgersen | July 13, 1948 |
| 2,468,602 | Lord | Apr. 26, 1949 |
| 2,482,612 | Drott et al. | Sept. 20, 1949 |
| 2,606,417 | Richey | Aug. 12, 1952 |
| 2,625,755 | Drott | Jan. 20, 1953 |
| 2,645,369 | Allan | July 14, 1953 |
| 2,660,816 | Maxwell | Dec. 1, 1953 |

FOREIGN PATENTS

| | | |
|---|---|---|
| 517,119 | Belgium | Feb. 14, 1953 |
| 1,036,696 | France | Sept. 10, 1953 |